US008501049B2

(12) United States Patent
Kim et al.

(10) Patent No.: US 8,501,049 B2
(45) Date of Patent: Aug. 6, 2013

(54) SEMICONDUCTIVE COMPOSITION AND THE POWER CABLE USING THE SAME

(75) Inventors: Yoon-Jin Kim, Gunpo-si (KR); Chang-Mo Ko, Gwangmyeong-si (KR); Ung Kim, Gunpo-si (KR)

(73) Assignee: LS Cable & System Ltd., Anyang (KR)

( * ) Notice: Subject to any disclaimer, the term of this patent is extended or adjusted under 35 U.S.C. 154(b) by 0 days.

(21) Appl. No.: 13/233,386

(22) Filed: Sep. 15, 2011

(65) Prior Publication Data

US 2012/0001128 A1    Jan. 5, 2012

Related U.S. Application Data

(63) Continuation of application No. PCT/KR2010/004927, filed on Jul. 27, 2010.

(30) Foreign Application Priority Data

Mar. 16, 2010 (KR) ........................ 10-2010-0023352

(51) Int. Cl.

| | |
|---|---|
| ***H01B 1/04*** | (2006.01) |
| ***H01B 1/06*** | (2006.01) |
| ***H01B 1/24*** | (2006.01) |
| ***B60C 1/00*** | (2006.01) |
| ***C08K 3/04*** | (2006.01) |

(52) U.S. Cl.

USPC ........... 252/511; 252/502; 524/495; 977/742; 977/750; 977/752

(58) Field of Classification Search

USPC ........... 252/500, 502, 511; 524/495; 977/742, 977/750, 752

See application file for complete search history.

(56) References Cited

U.S. PATENT DOCUMENTS

| | | | | |
|---|---|---|---|---|
| 2005/0205850 | A1 | 9/2005 | Whiteford et al. | |
| 2006/0182961 | A1 * | 8/2006 | Person et al. | 428/364 |
| 2008/0226918 | A1 | 9/2008 | Lee et al. | |
| 2009/0056973 | A1 | 3/2009 | Kjellqvist et al. | |
| 2010/0078194 | A1 * | 4/2010 | Bhatt et al. | 174/110 SR |

FOREIGN PATENT DOCUMENTS

| | | | |
|---|---|---|---|
| EP | 1 052 654 | A1 | 11/2000 |
| EP | 1731558 | A1 * | 12/2006 |
| JP | 2000-357419 | | 12/2000 |
| KR | 10-2000-0060114 | A | 10/2000 |
| KR | 10-2003-0005709 | A | 1/2003 |
| KR | 10-2004-0082835 | A | 9/2004 |
| KR | 10-2007-0019055 | A | 2/2007 |
| KR | 2007 0019055 | * | 2/2007 |
| KR | 10-0907711 | | 7/2009 |

OTHER PUBLICATIONS

Elastocom, Cable Tesing IEC 811-2-1. pp. 1-4. Date unknown.*

* cited by examiner

*Primary Examiner* — Harold Pyon
*Assistant Examiner* — Tanisha Diggs
(74) *Attorney, Agent, or Firm* — NSIP Law

(57) ABSTRACT

A semiconductive composition and a power cable using the same are provided. A semiconductive composition includes, per 100 parts by weight of a polyolefin base resin, 0.5 to 2.15 parts by weight of carbon nanotubes, and 0.1 to 1 parts by weight of an organic peroxide crosslinking agent.

5 Claims, 2 Drawing Sheets

SEMICONDUCTIVE COMPOSITION AND THE POWER CABLE USING THE SAME

CROSS-REFERENCE TO RELATED APPLICATION

This application is a continuation application of International Application PCT/KR2010/004927, filed on Jul. 27, 2010, which claims the benefit under 35 U.S.C. §119(a) of Korean Patent Application No. 10-2010-0023352, filed on Mar. 16, 2010, the entire disclosure of which is incorporated herein by reference for all purposes.

BACKGROUND

1. Field

The following description relates to a semiconductive composition having a volume resistivity of a semiconductive material maintained below a predetermined level while not deteriorating dispersion with a base resin, and a power cable using the same.

2. Description of Related Art

Conventionally, a large amount of carbon black was filled into a semiconductive composition for a power cable to maintain a volume resistivity of a semiconductive material below a predetermined level. For example, Korean Patent No. 10-522196 discloses a semiconductive composition for a high pressure cable, including a base resin and 45 to 70 parts by weight of carbon black. In addition, Korean Patent No. 10-450184 suggests a semiconductive water blocking pellet compound for a power cable, including a base resin and 20 to 50 parts by weight of carbon black. Moreover, Korean Patent No. 10-291668 teaches a semiconductive material for a high pressure cable, including a matrix resin and 40 to 80 parts by weight of carbon black.

As mentioned above, carbon black in a conventional semiconductive material was used with a large amount relative to a base resin, so that, disadvantageously, a power cable may have an increased volume and weight and a poor dispersion between the carbon black and a base resin. Generally, acetylene carbon black with high purity is used as the carbon black. However, acetylene carbon black contains a large amount of impurities, including, for example, ionic impurities, such as calcium, potassium, sodium, magnesium, aluminum, zinc, iron, copper, nichrome, silicon and so on, and other impurities, such as ash, sulfur and so on. These impurities may create a large protrusion in an insulation of a power cable.

Accordingly, there is an urgent need for a semiconductive composition capable of reducing a size of an insulation protrusion that may occur, as well as maintaining a volume resistivity of a semiconductive material below a predetermined level while not deteriorating the dispersion with a base resin.

SUMMARY

In one general aspect, there is provided a semiconductive composition, including, per 100 parts by weight of a polyolefin base resin, 0.5 to 2.15 parts by weight of carbon nanotubes, and 0.1 to 1 parts by weight of an organic peroxide crosslinking agent.

The general aspect of the semiconductive composition may further provide 1 to 10 parts by weight of a conductivity agent per 100 parts by weight of a polyolefin base resin, the conductivity agent being carbon black, graphene, or a combination thereof.

The general aspect of the semiconductive composition may further provide, per 100 parts by weight of a polyolefin base resin, 0.1 to 2 parts by weight of an anti-oxidant, and 0.1 to 2 parts by weight of an ion scavenger or an acid scavenger.

The general aspect of the semiconductive composition may further provide that the semiconductive composition satisfies the following formula:

$$\frac{VR \times CNT \times HS}{100{,}000} < 300,$$

where VR is a volume resistivity (Ωcm) measured at 90° C., CNT is weight % of the carbon nanotubes to the total weight of the semiconductive composition, and HS is a hot set value (%) measured according to IEC 811-2-1.

The general aspect of the semiconductive composition may further provide that the polyolefin includes ethylene vinyl acrylate, ethylene methyl acrylate, ethylene ethyl acrylate, ethylene butyl acrylate, or any combination thereof.

In another aspect, there is provided a power cable, including an insulation manufactured from the general aspect of the semiconductive composition.

Other features and aspects may be apparent from the following detailed description, the drawings, and the claims.

Figure 1:
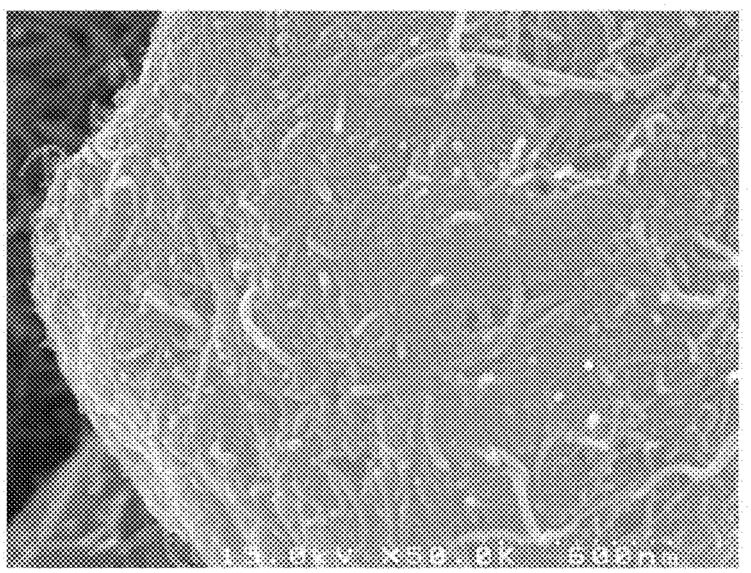
FIG. 1 is an SEM (Scanning Electron Microscopy) image illustrating an example of MWCNT-EEA mixed particles obtained by mixing multi-walled carbon nanotubes (MWCNT) with ethylene ethylacrylate (EEA).

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

A semiconductive composition includes 0.5 to 2.15 parts by weight of carbon nanotubes as conductive particles, and 0.1 to 1 parts by weight of an organic peroxide crosslinking agent, per 100 parts by weight of a polyolefin base resin.

The polyolefin used as a base resin may include ethylene vinyl acrylate, ethylene methyl acrylate, ethylene ethyl acrylate (EEA), ethylene butyl acrylate (EBA), and so on, singularly or in combination. The content of a polyolefin copolymer is preferably 10 to 50 weight %, and a preferred melting index is 1 to 20 g/10 minutes.

The carbon nanotubes may include all carbon nanotubes produced by a typical synthesis method, for example, single-walled carbon nanotubes (SWCNT), double-walled carbon nanotubes (DWCNT), thin multi-walled nanotubes (thin MWCNT), multi-walled carbon nanotubes (MWCNT), and so on. The synthesis method removes a catalyst by liquid phase oxidation and eliminates amorphous carbon by high heat treatment to obtain carbon nanotubes having a high purity between 99% and 100%. The use of high-purity carbon nanotubes allows reduction in size of any protrusion that may occur to a resulting inner or outer semiconductive layer. As a result, the life of the inner or outer semiconductive layer may be prolonged. Furthermore, the use of conductive carbon nanotubes allows an increase of high heat diffusion, thereby increasing the allowable current and decreasing the diameter of an insulation or a conductor.

The carbon nanotubes may be easily bonded to the base resin only in an amount of 0.5 to 2.15 parts by weight, thereby improving dispersion with the base resin. For example, carbon nanotubes having a diameter between 10 and 20 nm may be used. The use of carbon nanotubes enables improvement in a melt flow rate of the semiconductive composition and a reduction in extrusion load, resulting in improved extrusion. Consequently, the power cable may have an improved quality.

To further improve dispersion between the carbon nanotubes and the base resin, the following method may be used. First, carbon nanotubes are surface-functionalized by a supercritical fluid technology, liquid phase oxidation-wrapping and so on, and then are mixed with the base resin using a Henschel mixer to ensure improved dispersion. The liquid phase oxidation-wrapping is surface-functionalization of carbon nanotubes with a carboxyl group by treating the carbon nanotubes with an acidic solution and purifying them. FIG. 1 shows a SEM image illustrating an example of MWCNT-EEA mixed particles obtained by mixing ethylene ethylacrylate (EEA) with multi-walled carbon nanotubes (MWCNT) surface-functionalized by liquid phase oxidation-wrapping, using a Henschel mixer.

Figure 2:
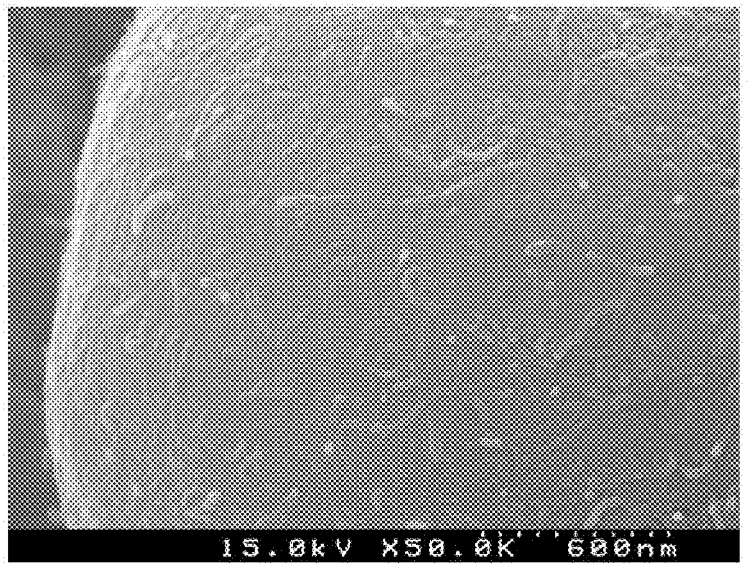
FIG. 2 is an SEM image illustrating an example of mixed particles obtained by mixing MWCNT with spherical EEA.

To further improve dispersion between the carbon nanotubes and the base resin, another method may be used as follows. The base resin is dissolved in a good solvent of chlorobenzenes, such as ortho-1,2-dichlorobenzene, 1,2,4-trichlorobenzene, and so on, and dissipated in a poor solvent, i.e., a polar solvent such as methanol, water and so on, to form a spherical base resin of a micrometer size. The spherical base resin is then mixed with carbon nanotubes using equipment such as a Hybridizer (Nara Machinery), a Nobilta (Hosokawa Micron), a Q-mix (Mitsui Mining), and so on, to produce mixed particles to ensure improved dispersion. FIG. 2 shows an SEM image illustrating an example of mixed particles obtained by mixing multi-walled carbon nanotubes (MWCNT) with spherical ethylene ethylacrylate (EEA) as mentioned above.

5 to 15 parts by weight of carbon black may be mixed with the carbon nanotubes. Carbon black particles have a high specific surface area between 40 and 200 $m^2/g$. Thus, a small reduction in content of carbon black leads to reduction in scorch volume and improvements in aspects of compounding, compounding rate, volume resistivity, compression, and reproducibility. As mentioned above, a small amount of carbon black is used. As a result, a power cable not subject to a considerable increase in volume and weight may be provided. Further, a reduction in costs for distributing and installing the power cable may be obtained.

Organic peroxide for chemical crosslinking is used as a crosslinking agent. For example, dicumyl peroxide (DCP) may be used as the organic peroxide crosslinking agent. In addition, the content of the crosslinking agent is 0.1 to 1 part by weight per 100 parts by weight of the base resin. If the content of the crosslinking agent is less than 0.1 parts by weight, insufficient crosslinking occurs, which reduces the mechanical properties of a resulting semiconductive layer. If the content of the crosslinking agent is greater than 1 part by weight, excess of thermal by-products (e.g., scorch) occurs during crosslinking, which reduces volume resistivity of a resulting semiconductive layer.

The semiconductive composition may further include 0.1 to 2 parts by weight of an antioxidant and 0.1 to 2 parts by weight of an ion scavenger or an acid scavenger, per 100 parts by weight of the polyolefin base resin.

As the antioxidant, amines and their derivatives, phenols and their derivatives, or reaction products of amines and ketones may be used, either singularly or in combination. For example, to improve heat resistant characteristics, reaction products of diphenylamine and acetone, zinc 2-mercaptobenzimidazorate, or 4,4'-bis(α,α-dimethylbenzyle)diphenylamine, either singularly or in combination, may be used. In addition, pentaerythritol-tetrakis[3-(3,5-di-tert-butyl-4-hydroxy-phenyl)-propionate], pentaerythritol-tetrakis-(β-lauryl-thiopropionate), 2,2'-thiodiethylenebis-[3-(3,5-di-tert-butyl-4-hydroxyphenyl)-propionate], or distearyl-ester of bi,bi'-thiodipropionic acid, either singularly or in combination, may be used.

The semiconductive composition may further include a processing aid. As the processing aid, polyethylene wax, ester-based wax, aromatic alcohol fatty acid ester, a composite ester-based lubricant and so on, either singularly or in combination, may be used. For example, the processing aid may have a molecular weight between 1,000 and 10,000 and a density between 0.90 and 0.96 $g/cm^3$. A content of the processing aid may be 0.1 to 10 parts by weight per 100 parts by weight of the polyolefin base resin. If the content of the processing aid is less than 0.1 parts by weight, a mixing effect of each component of the composition is low. If the content of the processing aid is greater than 10 parts by weight, mechanical properties are remarkably deteriorated.

The semiconductive composition has the formula $$\frac{VR \times CNT \times HS}{100{,}000},$$

with its value being less than 300, or, for example, either less than 200 or less than 100. In the formula, VR is a volume resistivity (Ωcm) measured at 90° C., CNT is weight % of carbon nanotubes to the total weight of a semiconductive composition, and HS is a result (%) of a hot set test according to IEC 811-2-1.

The semiconductive composition may further include 5 to 20 parts by weight of silica per 100 parts by weight of the polyolefin base resin so as to improve mechanical properties such as tensile strength or the like. For example, nano-sized silica having a size between 1 and 100 nm or granular particles thereof, fused silica, fumed silica, nano clay, and so on may be used.

Figure 3:
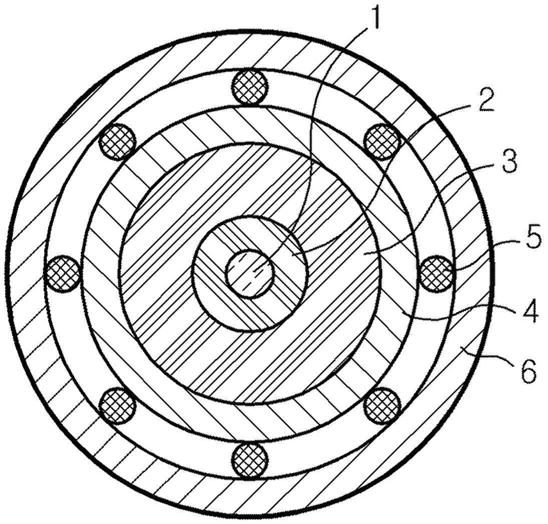
FIG. 3 is a cross-sectional view illustrating an example of a power cable.

A power cable may be manufactured with an inner or outer semiconductive layer, or a power cable with inner and outer semiconductive layers formed using the semiconductive composition. FIG. 3 shows an example of the power cable. The power cable may include a conductor 1, an inner semiconductive layer 2, an insulation 3, an outer semiconductive layer 4, a neutral wire 5, and a sheath 6. This configured power cable may have low surface roughness between the inner semiconductive layer 2 and the insulation 3 and between the outer semiconductive layer 4 and the insulation 3.

Hereinafter, examples will be described. However, one having ordinary skill in the art would understand that the descriptions provided herein are non-limiting examples for the purpose of illustration only.

Semiconductive compositions of examples and comparative examples were prepared according to the elemental ratio of the following table 1 in order to find out performance changes depending on components of the semiconductive composition.

TABLE 1

| Components | Example 1 | Example 2 | Example 3 | Comparative example 1 | Comparative example 2 | Comparative example 3 |
|---|---|---|---|---|---|---|
| Base resin | 100 | 100 | 100 | 100 | 100 | 100 |
| Antioxidant 1 | 0.3 | 0.3 | 0.3 | 0.3 | 0.3 | 0.3 |
| Antioxidant 2 | 0.5 | 0.5 | 0.5 | 0.5 | 0.5 | 0.5 |
| Carbon black | | | 10 | 45 | 60 | 75 |
| Carbon nanotubes | 1.5 | 2 | 1.3 | | 100 | |
| Ion scavenger | | | 1 | | | 100 |
| Dicumyl peroxide | 0.2 | 0.2 | 0.3 | 0.4 | 0.4 | 0.4 |

[Components of Table 1]

Polyolefin base resin: EEA/EBA blend

Antioxidant 1: tetrakis(methylene-3,5-di-t-butyl-4-hydroxyhydrocinnamate)methane Antioxidant 2: tris(2,4-di-t-butylphenyl)phosphite Ion scavenger: aryl-based silane Power cables with inner and outer semiconductive layers formed using the semiconductive compositions according to examples 1 to 3 and comparative examples 1 to 3 were manufactured by a typical method. The structure of the power cables is as shown in FIG. 3.

The samples of examples and comparative examples were tested for volume resistivity, tension strength at room temperature, elongation at room temperature, hot set and size of protrusion, and the results are shown in the following Table 2. The experimental conditions are as follows:

(1) Volume Resistivity

When an applied direct-current electric field is 80 kV/mm, a volume resistivity was measured at 25° C. and 90° C., respectively.

(2) Mechanical Properties at Room Temperature

When a power cable is tested at a tensile speed of 250 mm/min according to IEC 60811-1-1, a tensile strength should be 1.28 $Kgf/mm^2$ or higher and an elongation should be 250% or higher.

(3) Hot Set

After a sample is exposed under 150° C. air condition for 15 minutes, a hot set value was evaluated according to IECA T-562.

(4) Size of Protrusion

The size of a protrusion of an inner semiconductive layer should be 50 μm or less (SS cable) in the direction from the interface of the inner semiconductive layer toward an insulation.

TABLE 2

| Test items | | Example 1 | Example 2 | Example 3 | Comparative example 1 | Comparative example 2 | Comparative example 3 |
|---|---|---|---|---|---|---|---|
| Volume resistivity (Ωcm) | 25° C. | 1300 | 900 | 500 | 300 | 35 | 12 |
| | 90° C. | 500 | 300 | 100 | 120,000 | 750 | 146 |
| Tensile strength at room temperature ($Kgf/mm^2$) | | 1.5 | 1.6 | 1.55 | 1.46 | 1.46 | 1.42 |
| Elongation at room temperature (%) | | 390 | 390 | 400 | 309 | 184 | 172 |
| Hot set (%) | | 65 | 70 | 65 | 90 | 90 | 85 |
| Protrusion size (μm) | | 20 | 30 | 30 | 50 | 70 | 100 |

As shown in Table 2, power cables with inner and outer semiconductive layers formed using the semiconductive compositions of examples 1 to 3 met all the standards for volume resistivity, tensile strength at room temperature, elongation at room temperature, and hot set, and simultaneously exhibited small protrusions. Polymer composite materials containing carbon nanotubes such as the semiconductive compositions of examples 1 to 3 have NTC (Negative Temperature Coefficient) characteristics such that a specific resistivity value decreases as temperature increases. When compared with the semiconductive compositions containing carbon black according to comparative examples 1 to 3, the semiconductive compositions of examples 1 to 3 have a relatively higher content of base resin (polymer resin) than the other components, and, thus, as temperature increases, flowability of the resin increases and adjacent particles of carbon nanotubes becomes closer in distance. This reduces the contact resistance between carbon nanotube particles, and, consequently, reduces the volume resistivity of the semiconductive composition. For this reason, as temperature increases, a volume resistivity value decreases, and a volume resistivity value at 25° C. is larger than that of 90° C.

However, cables with inner and outer semiconductive layers formed using the semiconductive compositions of comparative examples 1 to 3 did not generally meet the standards for volume resistivity, elongation at room temperature, and hot set, and exhibited larger protrusions than the semiconductor composition examples 1 to 3. These results are based on the fact that the semiconductive compositions of comparative examples 1 to 3 do not contain carbon nanotubes, and, instead, contain a large quantity of carbon black. Polymer composite material containing a large amount of carbon black, such as the semiconductive compositions according to comparative examples 1 to 3, have PTC (Positive temperature Coefficient) characteristics, contrary to the semiconductive compositions containing carbon nanotubes according to examples 1 to 3.

According to teachings above, there is provided a semiconductive composition which may provide a power cable with an inner or outer semiconductive layer formed using the semiconductive composition that can satisfy the required properties, such as volume resistivity, mechanical properties, hot set, and so on, and reduce the size of any protrusion that may occur to the resulting inner or outer semiconductive layer.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A semiconductive composition, comprising, per 100 parts by weight of a polyolefin base resin:

0.5 to 2.15 parts by weight of carbon nanotubes;

1 to 10 parts by weight of a conductivity agent, the conductivity agent being carbon black, graphene, or a combination thereof; and 0.1 to 1 parts by weight of an organic peroxide crosslinking agent, wherein the semiconductive composition satisfies the following formula:

$$\frac{VR \times CNT \times HS}{100{,}000} < 300$$

wherein VR is a volume resistivity (Ωcm) measured at 90° C., CNT is weight % of the carbon nanotubes to the total weight of the semiconductive composition, and HS is a hot set value (%) measured according to IEC 811-2-1.

2. The semiconductive composition according to claim 1, further comprising, per 100 parts by weight of a polyolefin base resin:

0.1 to 2 parts by weight of an anti-oxidant; and 0.1 to 2 parts by weight of an ion scavenger or an acid scavenger.

3. The semiconductive composition according to claim 1, wherein the polyolefin base resin includes ethylene vinyl acrylate, ethylene methyl acrylate, ethylene ethyl acrylate, ethylene butyl acrylate, or any combination thereof.

4. A power cable, comprising:

an insulation manufactured from the semiconductive composition according to claim 1.

5. A power cable, comprising:

an insulation manufactured from the semiconductive composition according to claim 2.

* * * * *